United States Patent
Edenso

(10) Patent No.: US 7,347,428 B2
(45) Date of Patent: Mar. 25, 2008

(54) WEIGHTED SUNSCREEN

(76) Inventor: Lawrence L Edenso, 525 Clinton Ct., Arroyo Grande, CA (US) 93420

( * ) Notice: Subject to any disclaimer, the term of this patent is extended or adjusted under 35 U.S.C. 154(b) by 191 days.

(21) Appl. No.: 11/164,053

(22) Filed: Nov. 8, 2005

(65) Prior Publication Data

US 2007/0102031 A1    May 10, 2007

(51) Int. Cl.
- B62B 1/00 (2006.01)
- B62B 5/00 (2006.01)
- F16M 11/00 (2006.01)
- B65D 19/00 (2006.01)
- A45B 25/02 (2006.01)
- E04H 15/28 (2006.01)

(52) U.S. Cl. ............... 280/32.5; 280/35; 280/79.5; 280/79.11; 280/79.2; 280/79.7; 248/127; 248/128; 248/129; 248/345; 248/346.06; 248/346.2; 135/15.1; 135/16; 135/85; 135/98

(58) Field of Classification Search ............... 135/15.1, 135/16, 98, 85; 280/32.5, 35, 79.5, 79.11, 280/79.2, 79.7; 248/127, 128, 129, 346.06, 248/246.2, 345
See application file for complete search history.

(56) References Cited

U.S. PATENT DOCUMENTS

| | | | | |
|---|---|---|---|---|
| 120,478 | A | * | 10/1871 | Asbile ...................... 280/7.17 |
| 2,603,028 | A | * | 7/1952 | Roberts ......................... 43/55 |
| 3,712,640 | A | * | 1/1973 | Shipman et al. ............ 280/301 |
| 3,717,124 | A | * | 2/1973 | Jacobs ........................ 119/223 |
| 4,000,750 | A |   | 1/1977 | Becher |
| D255,958 | S |   | 7/1980 | Browning |
| 5,035,445 | A | * | 7/1991 | Poulin ..................... 280/763.1 |
| 5,299,530 | A | * | 4/1994 | Mukadam et al. .......... 119/223 |
| 5,464,237 | A |   | 11/1995 | Saporiti |
| 5,630,600 | A | * | 5/1997 | Pasillas ................. 280/33.994 |
| 5,857,695 | A |   | 1/1999 | Crowell |
| 5,957,145 | A |   | 9/1999 | Plumer |
| 6,128,853 | A |   | 10/2000 | Klonel |
| 6,367,494 | B1 | * | 4/2002 | Tung ............................ 135/99 |
| 6,520,513 | B2 | * | 2/2003 | Presley-Mays ............. 280/32.5 |
| 6,648,349 | B1 | * | 11/2003 | Waller et al. ............. 280/47.35 |
| D484,303 | S | * | 12/2003 | Taylor .......................... D3/10 |
| D485,055 | S | * | 1/2004 | Taylor .......................... D3/10 |
| 2005/0189005 | A1 | * | 9/2005 | Smith et al. .................. 135/16 |
| 2006/0054206 | A1 | * | 3/2006 | Bilotti ......................... 135/16 |

FOREIGN PATENT DOCUMENTS

DE    3020189 A * 12/1981

* cited by examiner

*Primary Examiner*—Christopher P. Ellis
*Assistant Examiner*—John R. Olszewski
(74) *Attorney, Agent, or Firm*—Advantia Law Group; Michael W. Starkweather; Jason P. Webb

(57) ABSTRACT

A weighted sunscreen for outdoor use, which includes a shade having an elongated post with a first end, a second end, and a canopy attached to the first end, a weight, to which the second end is attached, a platform comprising an upper side upon which the weight is mounted, and a lower side, and at least three wheels attached to the lower side of the platform. The weighted sunscreen may also include a stopping device to keep the weighted sunscreen from moving. The weight may be concrete, a statue, a planter, an aquatic planter, or an aquarium.

9 Claims, 3 Drawing Sheets

WEIGHTED SUNSCREEN

FIELD OF THE INVENTION

The present invention relates to weighted sunscreens, specifically weighted sunscreens for outdoor use.

DESCRIPTION OF THE RELATED ART

In U.S. Pat. No. 5,957,145 Plumer discloses a selectively moveable umbrella for use in providing shade during outdoor leisure and work-related activities, in which a support holds an umbrella post with a first end and a canopy attached to a plurality of support ribs extending from a portion of the post near a second end distal from the first end. The support attaches to a triangular base frame. An elongated handle extends outwardly from under the canopy from a corner edge of the base frame. Two back wheels are attached to the base frame near an end remote from the handle and an additional support depends from an end of the base frame remote from the back wheels. Using the handle, the base frame is moved in order to wheel the umbrella to a new position for shading outdoor activities.

Saporiti, in U.S. Pat. No. 5,464,237, discloses a folding cart that can be unfolded from a flat, collapsed position to an open position. The cart has opposing front and back side walls which have ledges on their opposing faces, and opposing foldable walls hingedly secured to the front and back side walls. A bottom shelf is positioned on the ledges, and a top lid is positioned on top of the walls to form an inner storage cavity. The cart has wheel assemblies which are pivotally mounted to opposite sides of the back wall, and adjustable legs for firmly fixing or securing the cart to the ground. An umbrella pole passes through openings in the lid and the bottom shelf.

In U.S. Pat. No. 4,000,750 Becher discloses a large shelter umbrella including a base having a supporting post the top of which is an umbrella, means mounting the supporting post at an end portion thereof for pivotal movement about a generally horizontal axis, the end portion having a free terminal end, means connected to the free terminal end for imparting a force thereto to pivot the supporting post about a horizontal axis, and lifting element means at a side of the horizontal axis opposite the terminal end connected between the base and the supporting post for imparting a force to the supporting post to pivot the latter about the horizontal axis.

Crowell discloses, in U.S. Pat. No. 5,857,695, a collapsible caddy which coverts into a table when collapsed has wheels adapted to pavement and sand. The caddy optionally is provided with an umbrella support and attachment openings.

Browning discloses in U.S. Design Pat. D255,958 an ornamental design for a sun shade or similar article.

U.S. Pat. No. 6,367,494 discloses a sunshade base comprises a base adapted to engage with a support tube of a sunshade and two wheel assemblies each having a mounting plate and at least one wheel. The mounting plate is pivotally mounted to the base. The wheel is rotatably mounted to the mounting plate. The mounting plate is pivotable between a storage position in which the wheel does not contact the ground and an operative position in which the wheel is located on the ground and thus raises the base above the ground.

Klonel discloses, in U.S. Pat. No. 6,128,853, a ball-wheeled planter has ball wheels in sockets attached to portions of bottoms of a plant container. Preferably the planter has trickle irrigation and fertilizer conveyances from a fluid container proximate a top portion of the planter. A drain basin can have a convenient return pump with manual, electrical or wick operation for returning flow-through water to a top portion of soil in the planter. The fluid container can have regulated outflow to match needs of particular plants soil planter depth and ambient conditions.

What is needed is a weighted sunscreen that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available weighted sunscreens. According to one embodiment, the present invention discloses a weighted sunscreen for outdoor use, including an elongated post with a first end, a second end, and a canopy attached to the first end, a weight, to which the second end is attached, a platform comprising an upper side upon which the weight is mounted, and a lower side, and at least three wheels attached to the lower side of the platform.

The platform may be constructed of cast iron. The weighted sunscreen may further include a stopping device attached to the platform. The stopping device may include a ground contacting surface that contacts the ground when the stopping device is engaged, and a push surface for engaging and disengaging the stopping device. The stopping device may be mounted to the platform with a hinge. The weight may be concrete. The weight may be a statue. The weight may be a container with plants. The weight may be a container with water and aquatic plants. The weight may be a container with water and aquatic animals.

According to another embodiment of the present invention, the weighted sunscreen for outdoor use, may consist only of an elongated post with a first end, a second end, and a canopy attached to the first end, a weight, to which the second end is attached, a platform comprising an upper side upon which the weight is mounted, and a lower side, and at least three wheels attached to the lower side of the platform.

The weight may be concrete. The weight may be a statue. The weight may be a container with plants. The weight may be a container with water and aquatic plants. The weight may be a container with water and aquatic animals.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
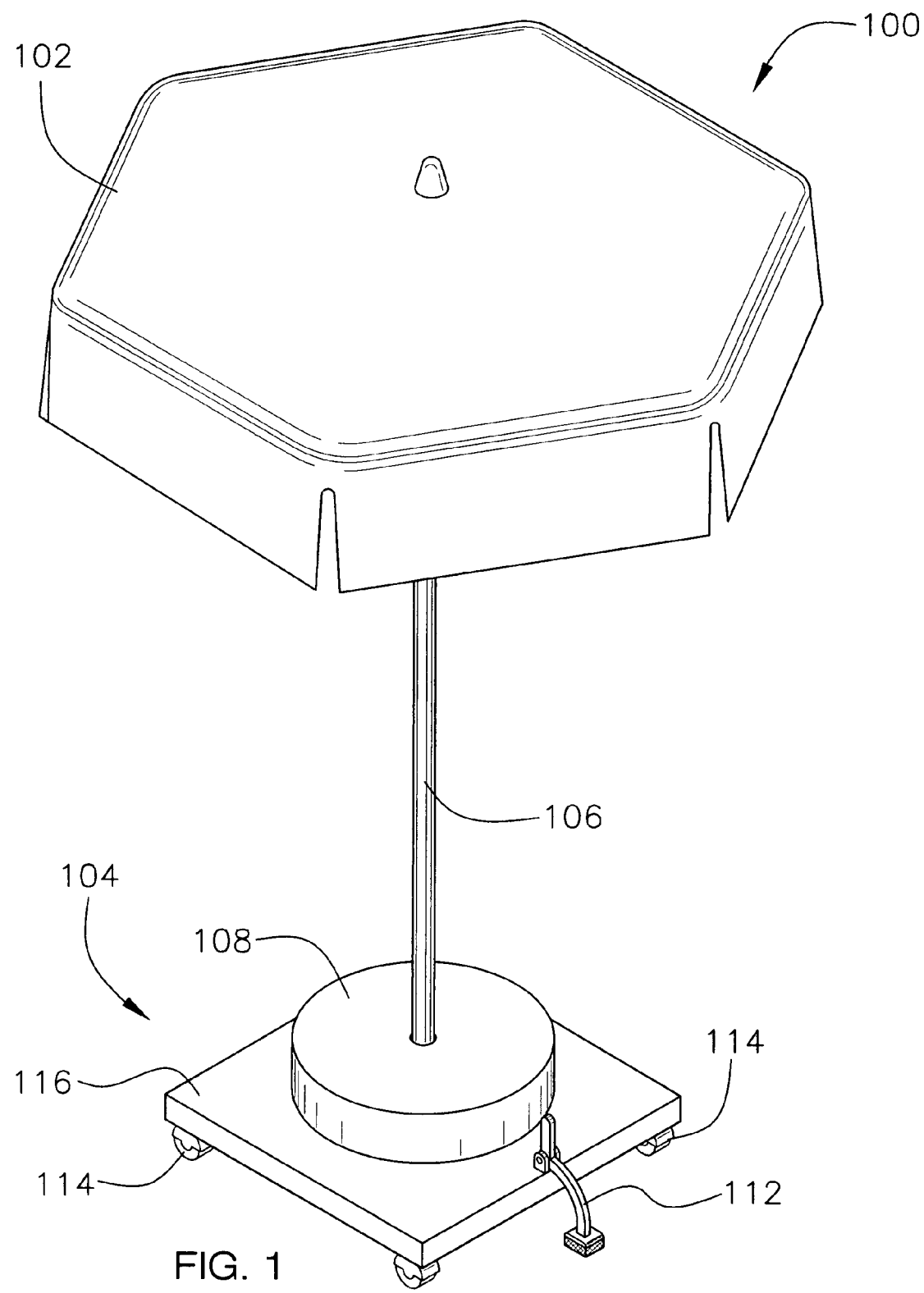
FIG. 1 illustrates a perspective view of the weighted sunscreen according to one embodiment of the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

FIG. 1 illustrates a perspective view of the weighted sunscreen according to one embodiment of the present invention. The weighted sunscreen 100 includes a canopy 102 and a base 104. The canopy 102 may be attached to the first end of an elongated member 106. The second end of the elongated member 106 may be attached to the base 104. The base 104 may include a weight 108. The weight 108 may be mounted to the top side of a platform 116. To the bottom side of the platform 116 may be mounted at least three wheels 114 to hold the platform 116 off of the ground, and to assist in the mobility of the weighted sunscreen 100.

Another advantage of the present invention is that it may include a stopping device 112. The stopping device 112 may resist the movement of the weighted sunscreen 100 when the stopping device 112 is engaged.

Figure 3:
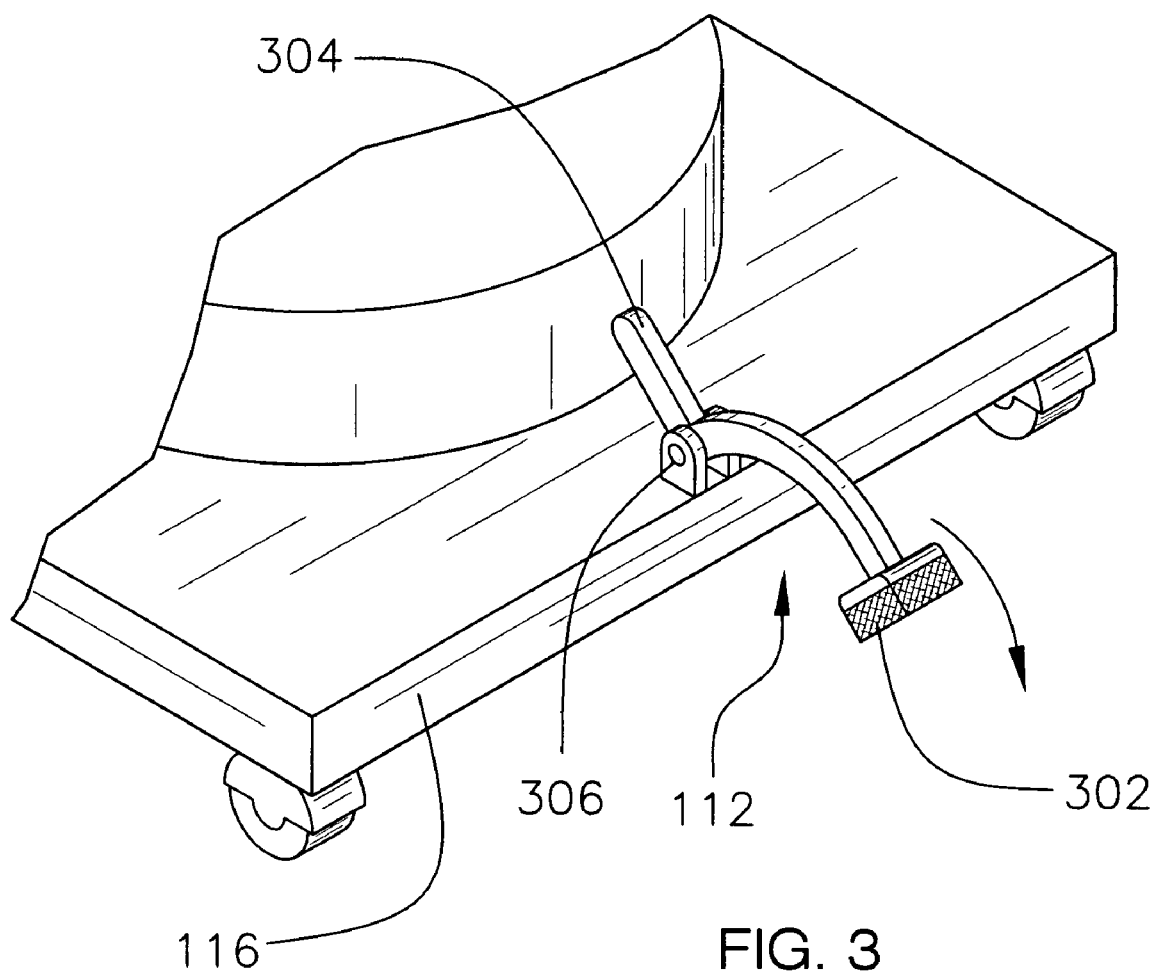
FIG. 3 illustrates the stopping device according to one embodiment of the present invention.

Turning now to FIG. 3, the stopping device 112 is illustrated. The stopping device 112 may be configured such that when it is engaged, it resists movement of the weighted sunscreen along the ground. As illustrated the stopping device includes a single elongated member 112, the single elongated member 112 including a first end 304 or pushing surface 304 and a second end 302. The stopping device 112 may, then, include a ground contacting surface 302 coupled to the second end, that moves as illustrated by the arrows. The stopping device may also include a pushing surface 304. When pressure is applied to one side of the pushing surface 304 the ground contacting surface 302 is disengaged, or is removed from the ground, allowing the weighted sunscreen 100 to be moved. When pressure is applied to the other side of the pushing surface 304, the stopping device 116 rotates as illustrated by the arrows, and the ground contacting surface 302 contacts the ground. In this position, the stopping device 116 resists movement of the weighted sunscreen 100 along the ground.

Figure 2:
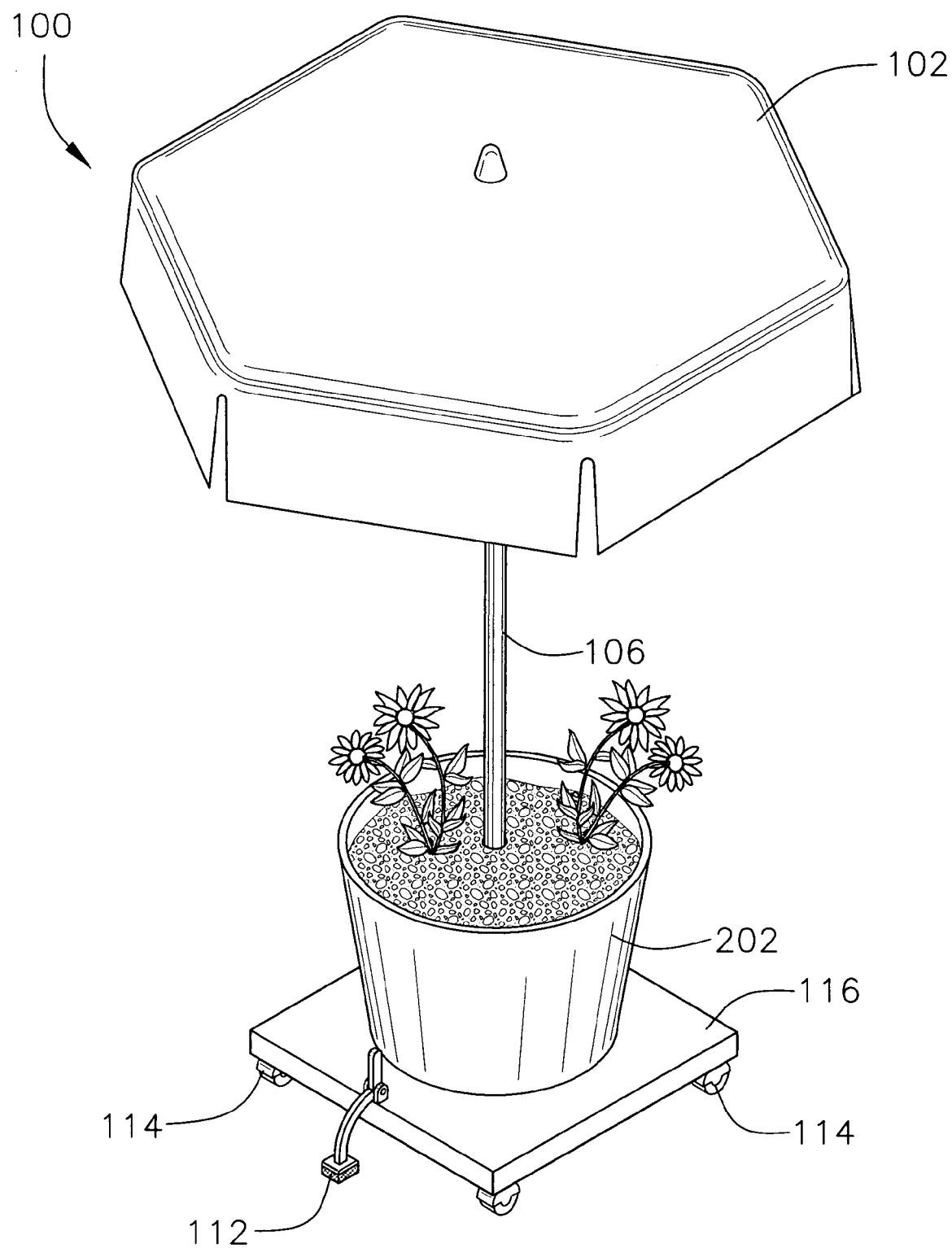
FIG. 2 illustrates a perspective view of the weighted sunscreen according to one embodiment of the present invention.

Turning to FIG. 2 is illustrated an alternative embodiment for the weight 108. In this embodiment, the weight 108 includes a planter 202. In yet another embodiment, the weight 108 may include a statue. In another embodiment, the weight 108 may include a container with water. The container with water may also include aquatic plants. The container with water may include aquatic animal life such as fish, turtles, crabs, lobsters, crawdads, frogs, and so forth. Generally, the weight 108 may include any item capable of weighing the sunscreen such that it does not move in normal weather conditions. In one embodiment, the weight 108 is at least about 15 pounds, or at least about 25 pounds, or at least about 50 pounds, or at least about 100 pounds.

The wheels 114 may be any known in the art. In one embodiment, three wheels 114 are mounted to the platform 116. In another embodiment, four wheels 114 are mounted to the platform 116. The wheels may be casters. The wheels may be mounted on ball bearings. The wheels may include a shaft.

The canopy 102 may include any known in the art. In one embodiment, the canopy 102 includes an umbrella mounted on ribs. In another embodiment, the canopy 102 may be collapsible. In another embodiment, the canopy 102 may be a single stiff member. The elongated member 106 may be selectably removable from the base 104.

The platform 116 may be constructed of any material known in the art. For example, the platform 116 may be constructed of cast iron, steel, concrete, wood, composite, plastic, or any other material capable of being a weight 108 or supporting the weight 108.

It is understood that the above-described preferred embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A weighted sunscreen for outdoor use, consisting of:
   an elongated post with a first end, a second end, and a canopy attached to the first end;
   a weight, to which the second end is attached;
   a platform comprising an upper side upon which the weight is mounted, and a lower side;
   at least three wheels attached to the lower side of the platform; and
   a stopping device pivotally coupled to the platform, wherein the stopping device includes:
      a single elongated member pivotally coupled to the platform, including:
         a first end; and
         a second end; and
      a single ground contacting surface coupled to second end, and configured to contact the ground.

2. The weighted sunscreen of claim 1, wherein the platform comprises cast iron.

3. The weighted sunscreen of claim 1, wherein the stopping device is pivotally coupled to the platform with a hinge.

4. The weighted sunscreen of claim 1, wherein the weight comprises concrete.

5. The weighted sunscreen of claim 1, wherein the weight comprises a statue.

6. The weighted sunscreen of claim 1, wherein the weight comprises a container with plants.

7. The weighted sunscreen of claim 1, wherein the weight comprises a container with water and aquatic plants.

8. The weighted sunscreen of claim 1, wherein the weight comprises a container with water and aquatic animals.

9. A weighted sunscreen for outdoor use, consisting of:
   an elongated post with a first end, a second end, and a canopy attached to the first end;
   a weight, to which the second end is attached, wherein the weight is selected from the group consisting of: a statue, a container with plants, a container with water and aquatic plants, a container with water and aquatic animals, and any combinations thereof.
   a platform comprising an upper side upon which the weight is mounted, and a lower side;
   at least three wheels attached to the lower side of the platform; and
   a stopping device attached to the platform including:
      a first end; and
      a second end; and
   a single ground contacting surface coupled to second end, and configured to contact the ground.

* * * * *